United States Patent [19]

Jaegers

[11] 3,919,908
[45] Nov. 18, 1975

[54] METAL COLD SAW
[76] Inventor: Leopold Jaegers, Rudolf-Diesel-Str. 1, 535 Euskirchen, Germany
[22] Filed: Nov. 12, 1973
[21] Appl. No.: 415,171

[30] Foreign Application Priority Data
Nov. 11, 1972 Germany............................ 2255347

[52] U.S. Cl. ................ 83/471.2; 83/477.2; 83/488; 83/527; 83/648
[51] Int. Cl.² ........................ B26D 1/14; B27B 5/18
[58] Field of Search ....... 83/477.2, 471.2, 485, 488, 83/455

[56] References Cited
UNITED STATES PATENTS
3,315,554   4/1967   Jaegers .................................. 83/488
3,695,135   10/1972  Jagers ............................ 83/471.2 X
3,768,358   10/1973  Zbinden ......................... 83/477.2 X FOREIGN PATENTS OR APPLICATIONS
100,350   6/1925   Austria ............................. 83/477.2
1,410,947   6/1967   France ............................. 83/477.2

Primary Examiner—Robert L. Spruill
Assistant Examiner—W. R. Briggs
Attorney, Agent, or Firm—Holman & Stern

[57] ABSTRACT

A metal cold saw, whose circular saw blade together with its gear housing can move forward, under and along a metal plate fixed firmly to a machine frame, in the direction of cutting towards a workpiece held on the metal plate. The metal plate supports the workpiece and transmits the cutting forces. The metal plate is so thin that it would be deformed by the cutting pressure if not supported on the supporting surface of the gear housing. A sliding guide is provided for the gear housing independent of the metal plate, the sliding guide capable of being adjusted in a direction normal to the metal plate.

4 Claims, 4 Drawing Figures

METAL COLD SAW

This invention concerns a metal cold saw, whose circular saw blade together with its gear housing can move forward, under and along a metal plate fixed firmly to a machine frame, in the direction of cutting towards a workpiece held on the machine frame of the metal cold saw, the metal plate serving to support the workpiece and transmit the cutting forces.

A metal cold saw of this type is known from the German Pat. No. 1 522 626, in which the gear housing has a supporting surface for the metal plate on its surface near the saw blade, and a sliding guide which is independent of the metal plate is provided for the gear housing.

In the case of this metal cold saw the gear housing is carried on the metal plate, which is rigid because of its considerable thickness. The reliable guiding of the saw blade thus achieved towards the position of the workpiece which is also secured by the metal plate makes it possible to cut workpieces of considerable thickness quickly and accurately. This advantage must be weighed against the fact that because of the thickness of the metal plate the cutting depth is relatively small, or that alternatively saw blades of relatively large diameter must be used.

SUMMARY OF THE INVENTION

The object of the invention is to make a metal cold saw of the above type, which can achieve a greater depth, other conditions being the same, so that saw blades of small diameter can be used to achieve a predetermined cutting depth. The use of a saw blade of small diameter means not only a saving when obtaining the saw blade, but also an essentially cheaper machine, because a reduction in saw blade diameter can lead to a corresponding reduction in the gears and the capacity needed and thus of the machine frame size. Saws of this type can even be built in lightweight construction.

In accordance with the invention, this objective is achieved by the fact that the metal plate is so thin that it would be deformed by the cutting pressure in a way which would hinder normal operation if it were not supported on the supporting surface of the gear housing, and that a sliding guide is provided for the gear housing which is independent of the metal plate, the height of the sliding guide being capable of being adjusted in a direction normal to the metal plate by means of rigid wedge adjusters. The thickness of the metal plate is preferably smaller than 1% of the saw blade diameter and is for example 4 to 8mm. It is preferable for the gear housing to be carried on a dovetail guide, which can be adjusted by means of wedges. The length of the supporting surface provided for the metal plate on the gear housing in the forward direction of movement of the saw blade is preferably at least equal to the maximum workpiece span length.

BRIEF DESCRIPTION OF THE DRAWINGS

The drawings show by way of example one embodiment of the invention wherein.

DETAILED DESCRIPTION OF PREFERRED EMBODIMENT

Figure 1:
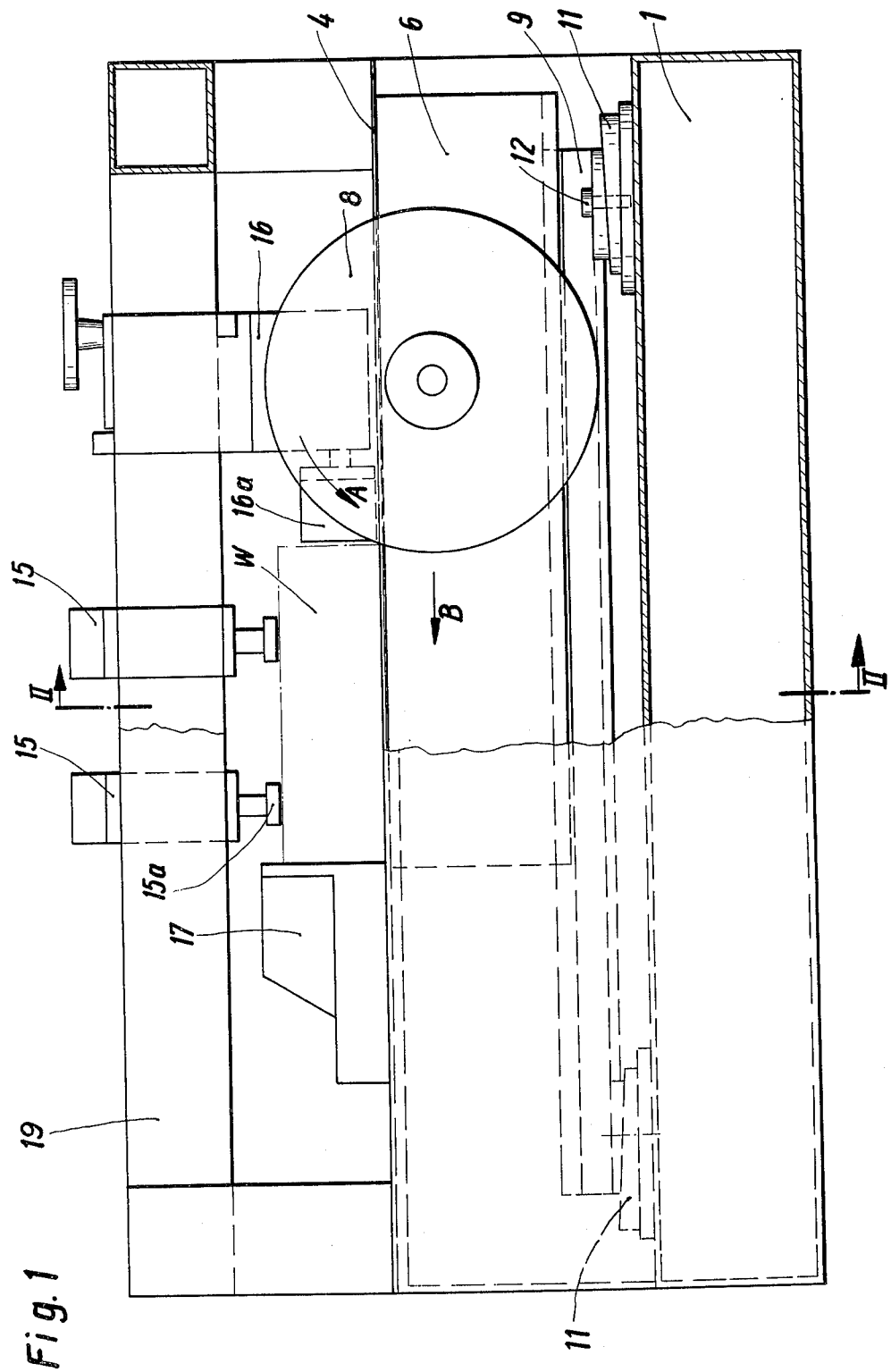
FIG. 1 shows a metal cold saw of the invention, partly in side view, partly in longitudinal section.
Figure 2:
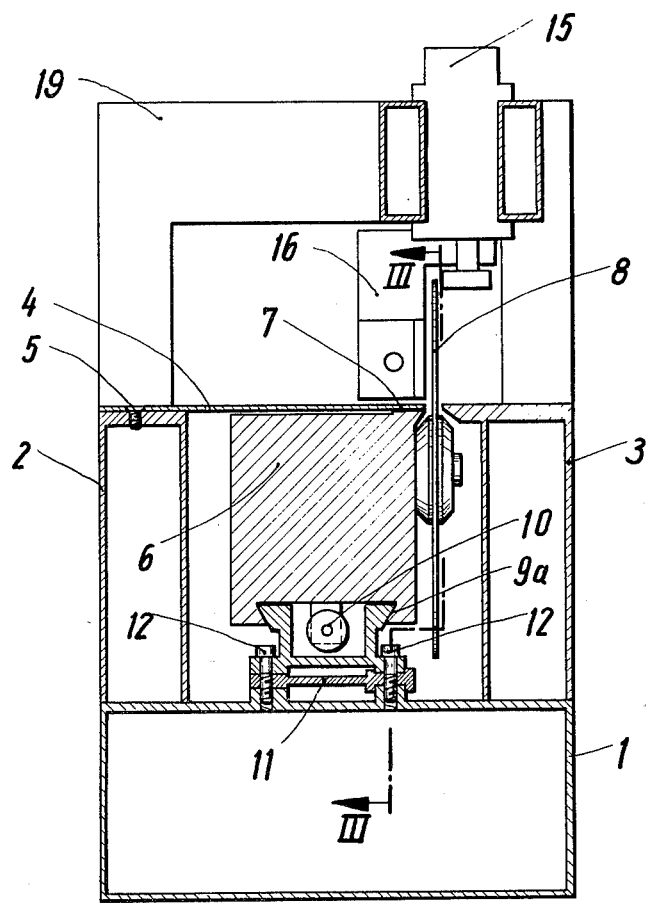
FIG. 2 is a section view taken along line II—II of FIG. 1.
Figure 3:
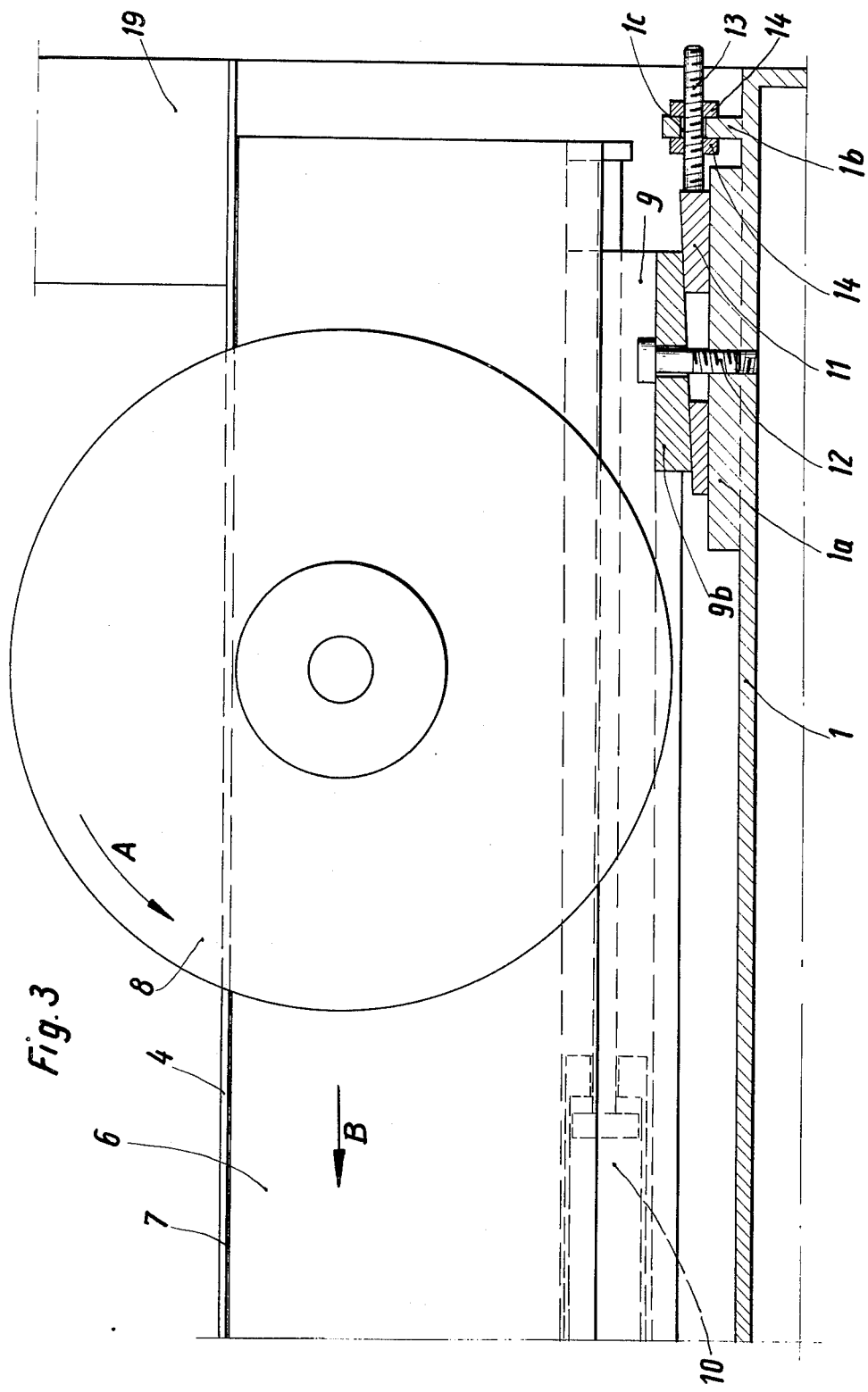
FIG. 3 is a section view taken along line III—III of FIG. 2.
Figure 4:
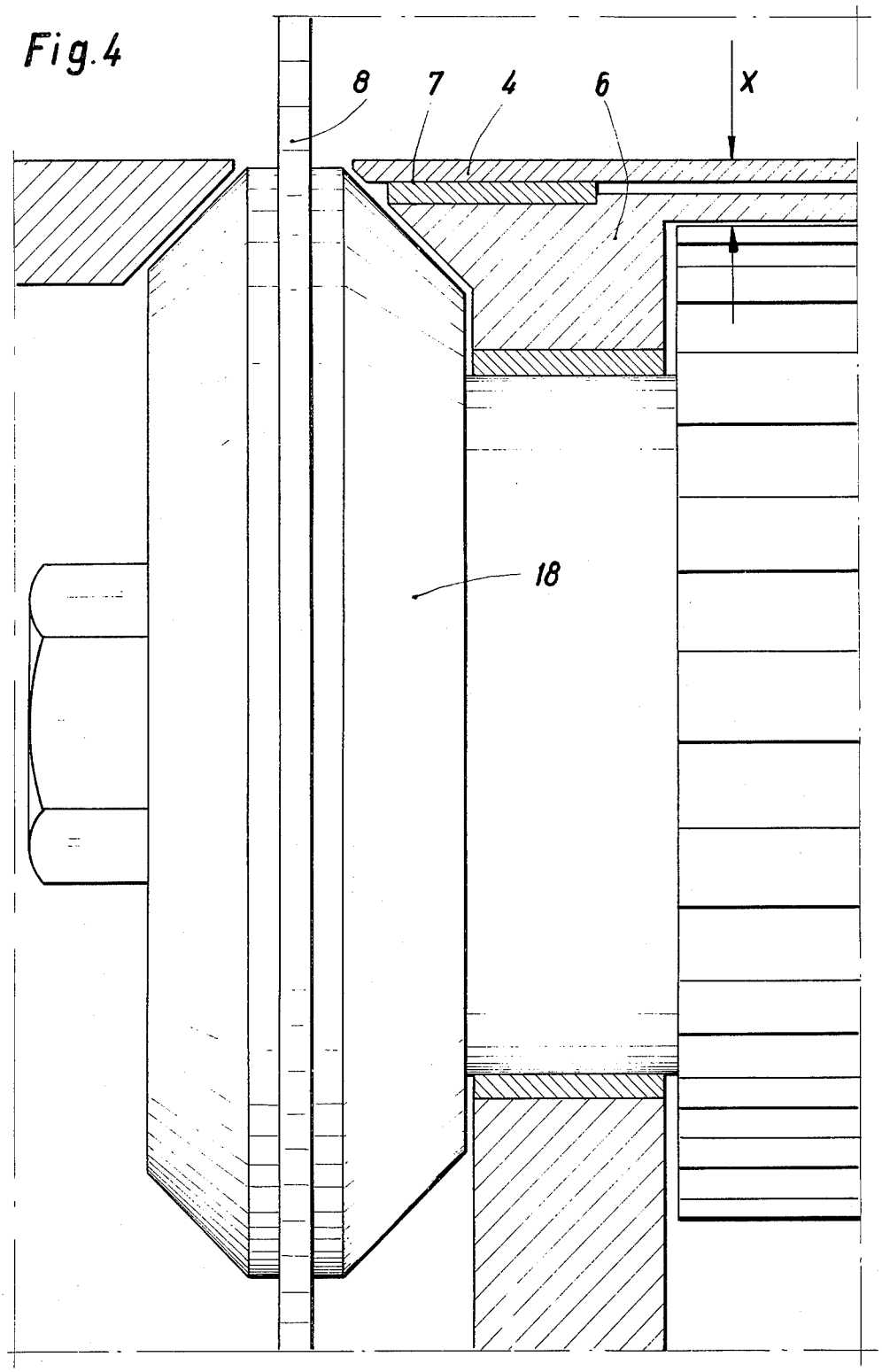
FIG. 4 is a section through another part of the metal cold saw in approximately normal size.

Two box-shaped vertical frame parts 2 and 3 are fitted parallel to one another on a box-shaped basic frame 1. A thin metal plate 4 is fastened on the vertical frame part 2 by means of bolts 5. Between the two frame parts 2 and 3 there is a guiding bed 9 with dovetail shaped guiding surfaces 9a, on which a housing 6 is carried, which contains the drive gears of a circular saw blade 8. The gear housing has a guiding ridge 7 near the saw blade, on which the metal plate 4 rests (FIG. 4). As the metal plate 4 is thin, the distance of its upper surface from the periphery of the hub 18 of the saw blade 8 is only a few millimeters, so that maximum use can be made of the diameter of the saw blade.

The top of the plate 4 lies in the same plane as the top of the frame part 3. To hold the guiding ridge 7 in the corresponding position, the guiding bed 9 is on wedges 11, which can be moved in between a supporting part 1a of the basic frame and an opposite support 9b of the guiding bed 9 by means of a threaded rod 13, which passes through a bore 1c of a projection 1b of the basic frame 1, a nut 14 being provided on both sides of the bore 1c. The parts 1a and 9b are connected by a bolt 12. The forward drive for the gear housing 6 is in the guiding bed 9. In the drawings a cylinder 10 is shown as a part of a hydraulic drive device. Instead of this, a mechanical spindle drive could be used.

A bridge 19 is fitted to the vertical frame parts 2 and 3, and supports movable devices for clamping a workpiece W. These devices consist of hydraulic cylinders 15, whose pistons are connected to pads 15a, which lie on the top of the workpiece W, and a horizontal cylinder 16, whose piston has a horizontal guide 16a for the workpiece. Opposite the guide 16a there is a fixed guide 17 on the plate 4 and the frame part 3.

A cutting operation is performed when the workpiece is firmly clamped by the clamping devices 15, 16, 17 and gear housiing 6 is moved forward in direction B by means of the hydraulic drive with the saw blade 8 rotating in the direction of the arrow A. The length of the guiding ridge 7 on the gear housing 6 on the front side of the saw blade 8 is at least as great as the maximum distance between the guides 16a and 17.

What I claim is:

1. A metal cold saw, whose circular saw blade together with its gear housing can move forward, under and along a metal plate fixed firmly to a machine frame, in the direction of cutting towards a workpiece held on the machine frame of the metal cold saw, the metal plate serving to support the workpiece and transmit the cutting forces, the gear housing having, on its surface transverse to and near the saw blade, a supporting surface for the metal plate, which plate has a thickness smaller than 1% of the saw blade diameter and is so thin that it would be deformed by the cutting pressure in a way that would hinder normal operation if it were not supported on the supporting surface of the gear housing, a sliding guide being provided for the gear housing which is independent of the metal plate, and means for varying the height of the sliding guide in a direction normal to the metal plate.

2. The metal cold saw as in claim 1, wherein the gear housing is carried on a dovetail guide.

3. The metal cold saw as in claim 2, wherein wedges are provided for adjusting the dovetail guide.

4. The metal cold saw as in claim 1, wherein the length of the supporting surface provided for the metal plate on the gear housing in the forward direction of movement of the saw blade is preferably at least equal to the maximum workpiece span length.

* * * * *